United States Patent [19]

Little

[11] Patent Number: 5,785,304
[45] Date of Patent: Jul. 28, 1998

[54] FLY VISE BASE ASSEMBLY

[76] Inventor: Frank Little, 405 Redstone, Las Vegas, Nev. 89128

[21] Appl. No.: 578,834

[22] Filed: Dec. 26, 1995

[51] Int. Cl.$^6$ ........................................ B25B 5/16
[52] U.S. Cl. .................... 269/16; 269/8; 269/71; 269/95; 269/76; 269/907
[58] Field of Search ..................... 269/8, 16, 15, 269/71, 907, 95, 76; 248/206.2, 205.8, 205.9

[56] References Cited

U.S. PATENT DOCUMENTS

| | | | |
|---|---|---|---|
| 2,120,571 | 6/1938 | Reichenstein et al. | 269/16 |
| 2,332,655 | 10/1943 | Miles . | |
| 2,676,504 | 4/1954 | Brugge et al. | 269/8 |
| 2,773,713 | 12/1956 | Smalley . | |
| 3,020,017 | 2/1962 | Watson | 248/205.8 |
| 3,082,988 | 3/1963 | Molden | 248/205.8 |
| 4,167,264 | 9/1979 | Kretzmeir | 269/16 |
| 4,169,562 | 10/1979 | Renzetti . | |
| 4,184,645 | 1/1980 | Starling . | |
| 4,336,960 | 6/1982 | Seki . | |
| 4,356,989 | 11/1982 | Ireland . | |
| 4,417,756 | 11/1983 | Herke . | |
| 4,573,719 | 3/1986 | Aldridge . | |
| 4,871,200 | 10/1989 | Ryder et al. . | |
| 4,934,641 | 6/1990 | McElhaney | 248/206.2 |

*Primary Examiner*—Robert C. Watson
*Attorney, Agent, or Firm*—Quirk & Tratos

[57] ABSTRACT

A fly vise base assembly includes a base member for securing a fly vise, a resilient elastomeric gas impermeable suction pad and a movable lever for drawing the suction pad from a first position to a second position for a suction seal for securing the base member.

14 Claims, 2 Drawing Sheets

5,785,304

FLY VISE BASE ASSEMBLY

BACKGROUND OF THE INVENTION

Devices for tying flies include a vise or clamp for securing the fishhook while the fly is tied. Examples of such apparatus are illustrated in U.S. Pat. Nos. 4,184,645, 2,120,571 and 4,169,562. Such devices often incorporate a base assembly for securing the fly-tying vise on a table or workbench. Other fly tying apparatus include stands and fixtures such as those disclosed in U.S. Pat. Nos. 4,17,756 and 2,332,655, which apparatus are used on a table or similar flat horizontal surface for accomplishing the work. Often, it is desirable to create and tie a fly in the field, to resemble a fly or insect on which the fish are feeding at the particular site and/or time of fishing. However, the above-described fly-tying devices must be used on a relatively flat and horizontal surface, or clamped on a table or bench. Thus, such devices cannot be conveniently used in the field at the fishing site.

SUMMARY OF THE INVENTION

The present invention is directed to a base assembly for securing a fly vise and holding other instruments and materials used in tying flies. The base assembly of the invention includes components for securing the apparatus to any generally flat, non-porous surface. The base assembly may be mounted on a truck bed, boat side or bottom, as well as the surface of a vehicle, regardless of the angle at which the surface extends. The specific features and advantages of the device will be evident from the following detailed description.

DETAILED DESCRIPTION OF THE PREFERRED EMBODIMENT

Figure 1:
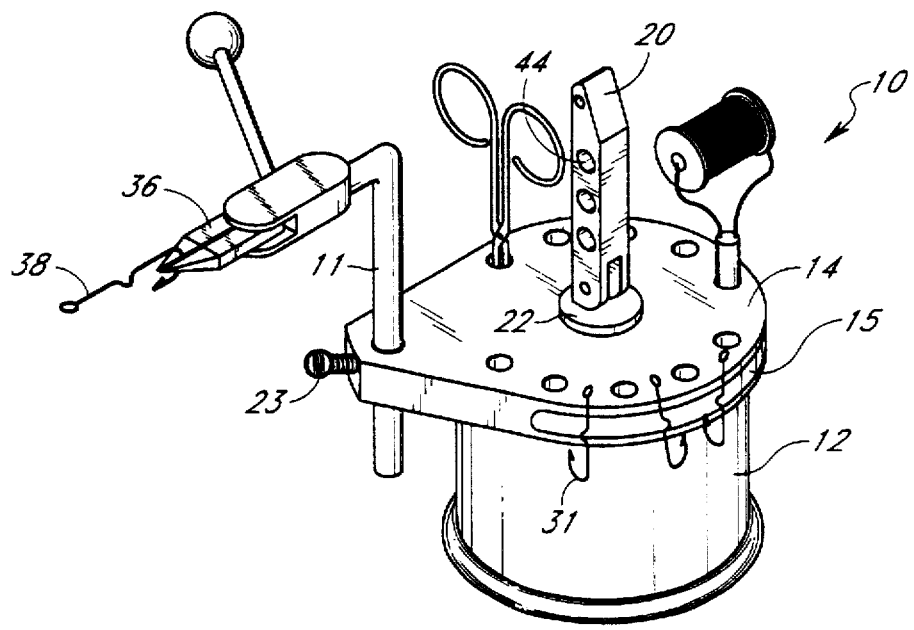
FIG. 1 is a perspective view of the base assembly of the invention.
Figure 2:
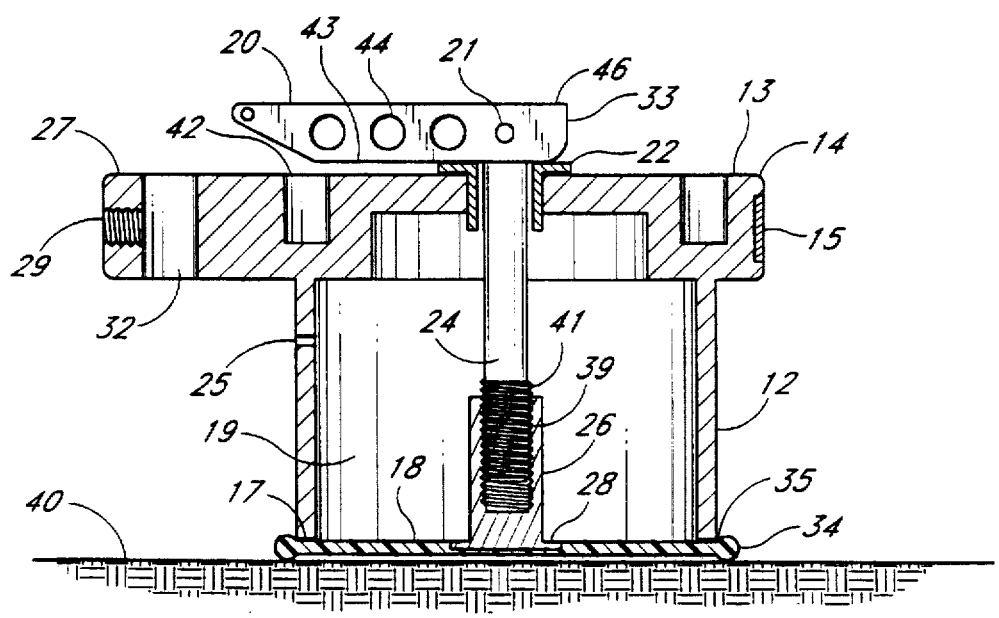
FIG. 2 is a side sectional view of the base assembly of FIG. 1.

As illustrated in FIGS. 1 and 2, the fly vise base assembly 10 includes a base member 12 having an interior cavity 19 defined between the top 14 and the side wall 12. In the embodiment illustrated, the side wall 12 is cylindrical and terminates in an annular bottom edge 17. The top 14 includes an aperture 30 extending between the upper surface 13 of top 14 and the hollow interior cavity 19.

Figure 3:
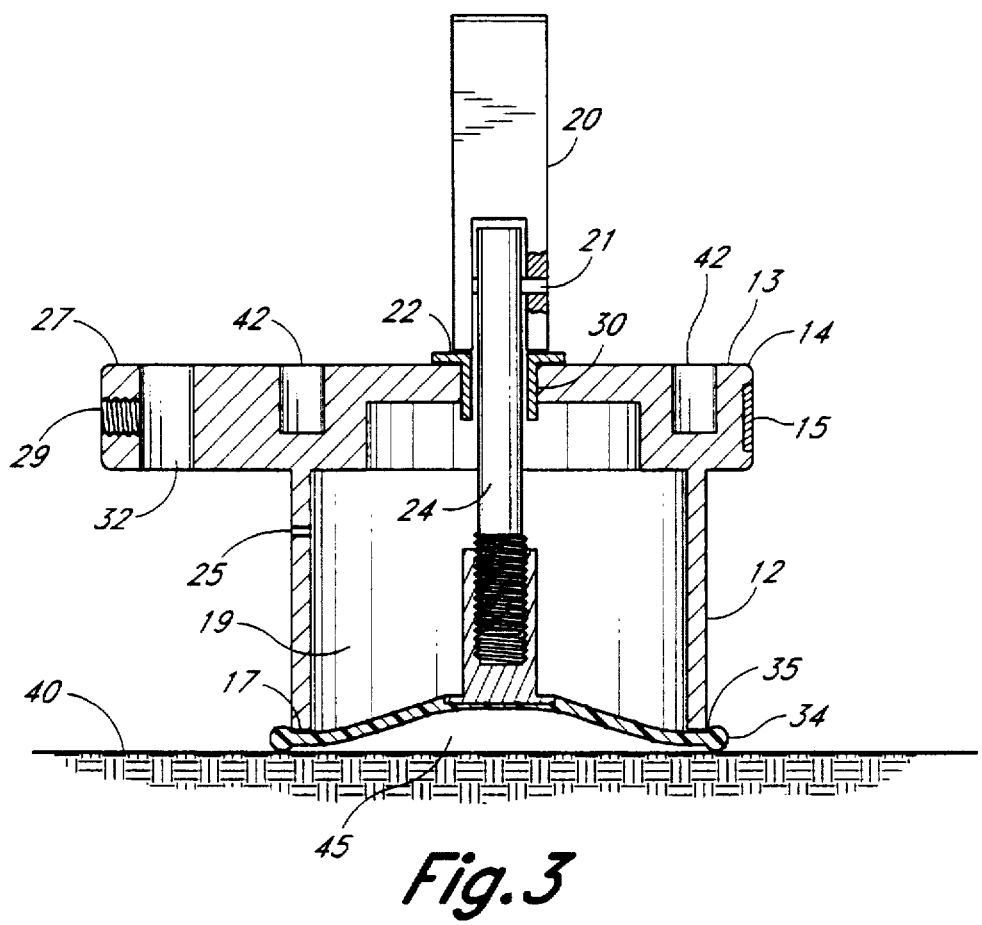
FIG. 3 is a side sectional view, illustrating the base assembly with the suction pad engaged.

A lever arm 20 has a spindle 24 attached via hinge pin 21 which spindle extends through the aperture 30 and into the hollow cavity 19. The apparatus includes a suction pad 18 secured to a flange member 28 and extension or sleeve 26 which threadedly engages the spindle 24. The lever arm can be positioned between a substantially vertical position as illustrated in FIGS. 1 and 3 and a horizontal position shown in FIG. 2. The hinge pin 21 is offset a greater distance from lever arm end 33 as compared to the offset distance from lever arm side 43. Thus, with the lever arm in the horizontal position, the hinge pin is relatively close to upper surface 13 whereby spindle 24 extends further into the cavity 19 and the suction pad 18 is in a first, unstressed condition as illustrated in FIG. 2. In this condition, the suction pad lies approximately flat and generally along a plane parallel with surface 40 on which the base assembly rests.

The suction pad 18 preferably comprises a resilient elastic material such as a synthetic elastomer, or natural or synthetic rubber material a layer of which is substantially gas impermeable and can be stretched or drawn to a second shape, and return to its original shape when the stress forces are released. Preferably, the circular suction pad comprises a sheet of substantially uniform thickness having an enlarged or thicker annular perimeter lip 34. The center area of the suction pad is secured to a flange member 28. Securing of the suction pad to flange member 28 may be accomplished during formation or molding of the suction pad. For example, a thermoplastic elastomer may be softened and formed around a rigid flange member 28, to which it becomes secured when cooled. Other equivalent means such as by using adhesives, tape, or by heat sealing or ultrasonically welding the elastomeric suction pad to the rigid flange member 28 may be used.

Extension 26 is secured to flange member 28 by threaded engagement, screws, brackets, or secured by other equivalent means including ultrasonic welding, adhesives, etc., as known to those skilled in the art. Alternatively, the flange member and extension may be a unitary component. Preferably, the extension 26 is threaded sleeve as shown in FIG. 2, and includes a threaded interior surface for engaging threads 41 along the lower end of spindle 24. The distance the spindle extends into the interior of the sleeve depends on their relative lengths and the suction force desired when the base member is engaged to a surface by a suction seal as will be discussed hereinafter. Other means of attaching the spindle 24 to the flange 28 may be used, without requiring an intermediate extension member 26. For example, spindle 24 may be directly secured to the flange 28, or the spindle and flange may be unitary, without requiring the extension or a threaded engagement means. Alternatively, the spindle 24 itself may be directly connected to the flange 28 using brackets, straps, or other members which may be secured to and extend between the two components. Moreover, the extension may be a threaded rod engaging an interiorly threaded sleeved spindle. The spindle 24 may also be secured to extension 26 with similar securing means, rather than by threaded engagement. It will be appreciated if that where the extension and/or the flange and spindle can be disengaged, assembly and disassembly of the apparatus for cleaning, repair, and/or storage is facilitated.

The top plate 14 is also provided with an aperture 30 through which spindle 24 extends. The aperture is preferably circular in shape, although other shapes may be used. A bushing 22 is preferably secured in the aperture 30 for supporting lever arm 20. The bushing may be annular, and have a flat top surface as shown for supporting the lever arm in the horizontal illustrated in FIG. 2 or the positions illustrated in FIGS. 1 and 3. A plastic bushing will act as a bearing to reduce wear and effort required to move the lever arm between the two positions.

Figure 4:
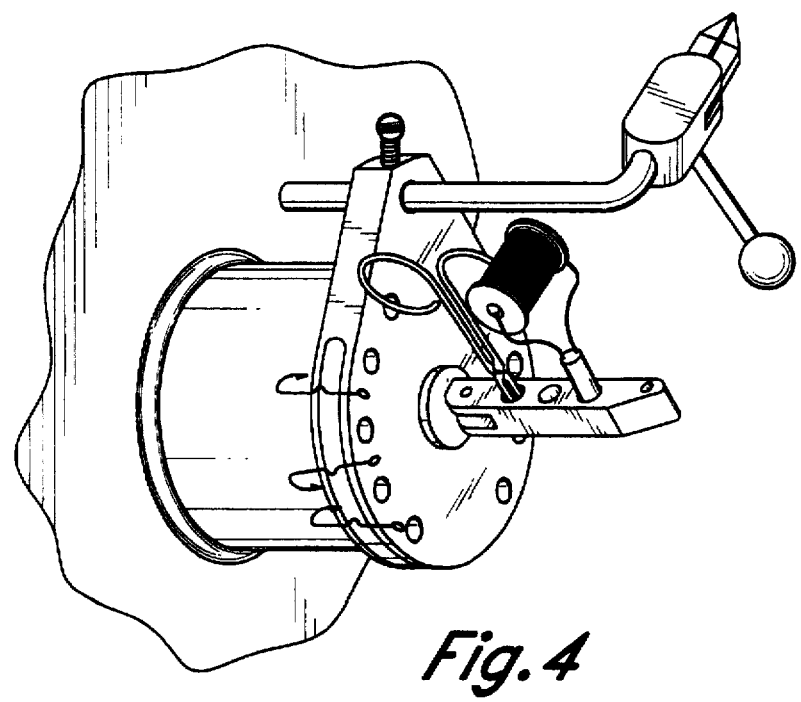
FIG. 4 is a perspective view of the base assembly in use with the suction pad engaged on a substantially vertical surface.

The top surface 13 of top plate 14 is also provided with a plurality of cavities 42 for holding fly-typing materials and tools as illustrated in FIG. 1. Such tools including scissors, clamps, thread holders, etc. commonly used in fly-tying may be conveniently placed in the cavities. The lever 20 also includes one or more orifices 44 into which the same fly-tying components, materials and/or accessories may be held, especially useful when the assembly is positioned as illustrated in FIG. 4 on a slanted or even a substantially vertical surface, such as the side a vehicle, truck bed side panel, or boat sides, etc. in which position the lever arm extends generally horizontally and in which the orifices are conveniently positioned for holding tools as shown. The assembly base also preferably includes one or more magnetized strips conveniently positioned for holding hooks to be used for fly-tying. The magnetized strip may be conveniently located on the outer circumferential side edge of top plate 13 as shown in FIGS. 1 and 2 or other desired position. A plurality of fish hooks 31 are shown magnetically secured to magnetic strip 15.

The shape of the base assembly is not necessarily critical, although a cylindrical shape as illustrated in the drawings is preferred. For example, a cylindrical base member suitably cooperates with an circular suction pad 18 having an annular lip 34 and circular shoulder 35 for abutting the annular bottom edge 17 of wall 16. It is important for the function and operation of the base assembly of the invention to achieve a nesting engagement or cooperation of the bottom edge 17 of the side wall with the upper surface of the suction pad. The enlarged bead or lip 34 with the circular shoulder formed along the top surface for abutting the circular outer edge of side wall 16 adjacent the lower end 17 provides the necessary support of the suction pad when it is drawn to form the suction seal as illustrated in FIG. 3 and as will be explained further hereinafter. Although other shapes, including regular shapes such as octagons, squares, rectangles, etc. may be used, as well as irregular shapes such an elliptical or other more rounded shapes, may be used, the cylindrical side wall base is preferred.

The top plate 14 is preferably enlarged relative to the side wall dimensions so as to give an enlarged top surface 13 for holding the fly-tie equipment, tools and components as previously explained and illustrated. The enlarged top plate also preferably includes means for securing the fly vise as illustrated in FIGS. 1–4. As shown, fly vise 11 is secured to the base assembly at the top plate with a portion of the fly vise extending into channel 32, and secured therein using a thumbscrew 23 which threadedly engages the top plate through threaded port 29. However, other equivalent means for securing the fly vise may be used, including clamps, brackets, screws, and the like. The fly vise itself may even be designed to include means for being secured, for example having threads formed along a portion of the fly vise for threadedly engaging a component or portion of the base assembly or the top plate. The fly vise illustrated in FIG. 1 includes the vise jaws or clamps 36 for holding a fishhook 38 during the fly-tying operation. However, the invention is not limited to the shape or features of the fly vise, and any commercially available fly vise which can be secured to the base assembly, and preferably the top plate, in a manner as illustrated in the embodiment of the assembly shown, may be used.

Use of the fly vise base assembly of the invention is understood by observing all four of the figures. In an unsecured position or condition, as illustrated in FIG. 2, the lever arm 20 is positioned so that it lies substantially parallel with the top surface 13. In the position shown, the spindle 24 is fully extended toward flange member 28 and suction pad 18 so that the suction pad is not drawn and thus is unstressed whereby there is no substantial suction formed between the lower surface of the suction pad and the surface on which the base member is positioned. In such a condition, the base member may be freely moved about, and placed where desired. To secure the base member on a surface, once the base member is in a desired position, the operator moves lever arm 20 to the extended or cocked position illustrated in FIGS. 1 and 3. As the lever arm is cocked, spindle 24 is pulled in the direction of the top plate which in turn pulls the extension 26 and flange member 28 thereby drawing the elastomeric suction pad 18 to a stressed or extended shape as illustrated in FIG. 3. Such a shape formed between the suction pad 18 and the generally flat and non-porous surface 40 creates a suction cavity 45 and a gas-tight seal between the surface 40 and the annular lip 34. This gas-tight seal and suction cavity may be maintained as long as there is no substantial gas leakage between the annular lip and the surface 40. Such gas leakage would compromise and reduce the suction or vacuum created in the suction cavity 45, whereby the base assembly would lose its attachment to the surface. The suction seal may be created between the base assembly and the non-porous surface regardless of the slant or angle of the surface relative to horizontal. This feature is further illustrated in FIG. 4 where the base assembly is positioned along a generally vertical surface, and remains substantially secure thereon so long as the vacuum in suction cavity 45 is sufficient to offset the force of gravity on the base assembly. A fly vise is secured to the base assembly so that an operator may tie a fly on a hook with the base assembly so mounted and secured on the slanted or vertical surface. As shown, accessories are conveniently held in the orifices along the lever arm.

In a preferred embodiment, the base assembly also is provided with a vent 25 between outside or ambient pressure and the interior of cavity 19. A specific vent may be bored in the side wall 16 of the base assembly as illustrated, or the interior of the cavity may communicate with ambient pressure by some other means, such as through aperture 30. Regardless of what means is used to create a vent with the interior cavity 19 and ambient pressure, the intent is to avoid creating any substantial vacuum within cavity 19 which could interfere with creating or releasing the suction seal between suction pad 18 and a surface 40 by manipulating lever arm 20 as previously described. These as well as other embodiments and features of the apparatus within the purview of the invention will be evident to those skilled in the art.

What is claimed is:

1. A fly vise assembly comprising:
 a base member comprising a top and side wall defining an interior cavity, said side wall having a substantially planar bottom edge defining an enlarged opening to said interior cavity, and a fly vise secured thereto;
 a resilient elastomeric gas impermeable suction pad and pull means secured thereto for drawing said suction pad from a first, unstressed shape to a second extended shape, said pad having an enlarged bead forming an annular lip extending around the perimeter thereof for forming a releasable suction seal with a gas impermeable surface when said suction pad is drawn to said second extended shape;
 an elongated movable lever arm positioned on top of said top wall having a hinge pin adjacent to one end of said arm and offset relative to said one end along the length of said arm, said hinge pin secured to said pull means and whereby said one end of said lever arm cooperates with said top wall for changing the distance between said hinge pin and said top wall when said lever arm is moved, whereby said lever is movable from a first position to a second position for drawing said suction paid to said second extended shape and creating said suction seal.

2. The assembly of claim 1 wherein said pull means includes a flange member thermally adhesively or ultrasonically secured to said suction paid.

3. The assembly of claim 2 wherein said pull means includes a rod secured to said hinge pin and said flange member.

4. The assembly of claim 2 wherein said suction pad comprises a natural or synthetic elastomer.

5. The assembly of claim 1 wherein said top includes a plurality of cavities for holding fly tying materials and tools.

6. The assembly of claim 1 wherein said lever has one or more orifices therein for holding fly tying tools and materials.

7. The assembly of claim 1 including a magnetized material secured on said base member.

8. The assembly of claim 1 wherein said annular lip forms an annular shoulder abutting said side wall adjacent to said bottom edge.

9. The assembly of claim 1 including an air vent extending through said base member for equalizing ambient pressure in said cavity when said suction seal is created.

10. The assembly of claim 1 wherein said fly vise is releasably secured to said base member.

11. The assembly of claim 1 wherein said base member includes an aperture extending from said top to said interior cavity, and wherein said pull means extends through said aperture.

12. The assembly of claim 11 including a bushing in said aperture for abutting said one end of said lever arm.

13. The assembly of claim 1 wherein the top of said base member comprises a planar surface having an aperture at or near the center thereof and extending into said interior cavity, and wherein said lever extends through said aperture and is connected to said pull means in said cavity.

14. The assembly of claim 13 wherein said planar surface has a circular edge extending along a major portion of the perimeter of said planar surface, and wherein said aperture is located substantially at the center of the radius of said circular edge.

* * * * *